June 9, 1953 M. R. ROBINSON 2,641,504
AGRICULTURAL SPRAYING MACHINE
Filed Aug. 2, 1948 3 Sheets-Sheet 1

June 9, 1953 M. R. ROBINSON 2,641,504
AGRICULTURAL SPRAYING MACHINE
Filed Aug. 2, 1948 3 Sheets-Sheet 2

INVENTOR
M. R. Robinson
BY
ATTORNEYS

June 9, 1953      M. R. ROBINSON      2,641,504
AGRICULTURAL SPRAYING MACHINE

Filed Aug. 2, 1948      3 Sheets-Sheet 3

INVENTOR
M. R. Robinson
BY
ATTORNEYS

Patented June 9, 1953

2,641,504

UNITED STATES PATENT OFFICE 2,641,504

AGRICULTURAL SPRAYING MACHINE

Mayes R. Robinson, Gilroy, Calif., assignor to Air-O Fan Products Corporation, Gilroy, Calif., a corporation of California Application August 2, 1948, Serial No. 41,958

8 Claims. (Cl. 299—41)

This invention is directed to, and it is an object to provide, a vehicle supported, power driven agricultural spraying machine of novel construction and operation; the machine being especially useful for orchard spraying, although not limited to such use.

Another object of the invention is to provide an agricultural spraying machine which is operative to discharge spray material, in a preselected pattern, in a transverse vertical plane wherein said pattern extends to a substantial height and to a considerable distance on opposite sides of the machine, whereby to accomplish full coverage of the trees of orchard rows between which the machine travels.

A further object of the invention is to provide an agricultural spraying machine which embodies a novel centrifugal fan and cooperating deflector vane assembly; the deflector vanes surrounding a portion of the periphery of the fan and being adjustable for the purpose of pattern control of the spray, i. e. the re-direction of the air discharge or flow from the fan as working conditions may require.

An additional object of the invention is to employ the deflector vanes as the support for the spray nozzles, so that in any position of adjustment of the vanes the nozzles always remain in alinement therewith for proper discharge of the spray.

Another object of the invention is to provide an agricultural spraying machine, as above, wherein the deflector vanes are hollow and feed from the internal reservoir to the nozzles; the pivotal mount for said vanes including a conduit which supplies liquid spray into said vanes.

It is also an object of the invention to provide an agricultural spraying machine which is capable of fully and effectively spraying large areas per day, and at a speed and economy not possible by other methods, such as hand spraying.

A further object of the invention is to provide a practical and reliable agricultural spraying machine, and yet one which will be exceedingly effective for the purpose for which it is designed.

These objects are accomplished by means of such structure and relative arrangement of parts as will fully appear by a perusal of the following specification and claims.

Figure 1:
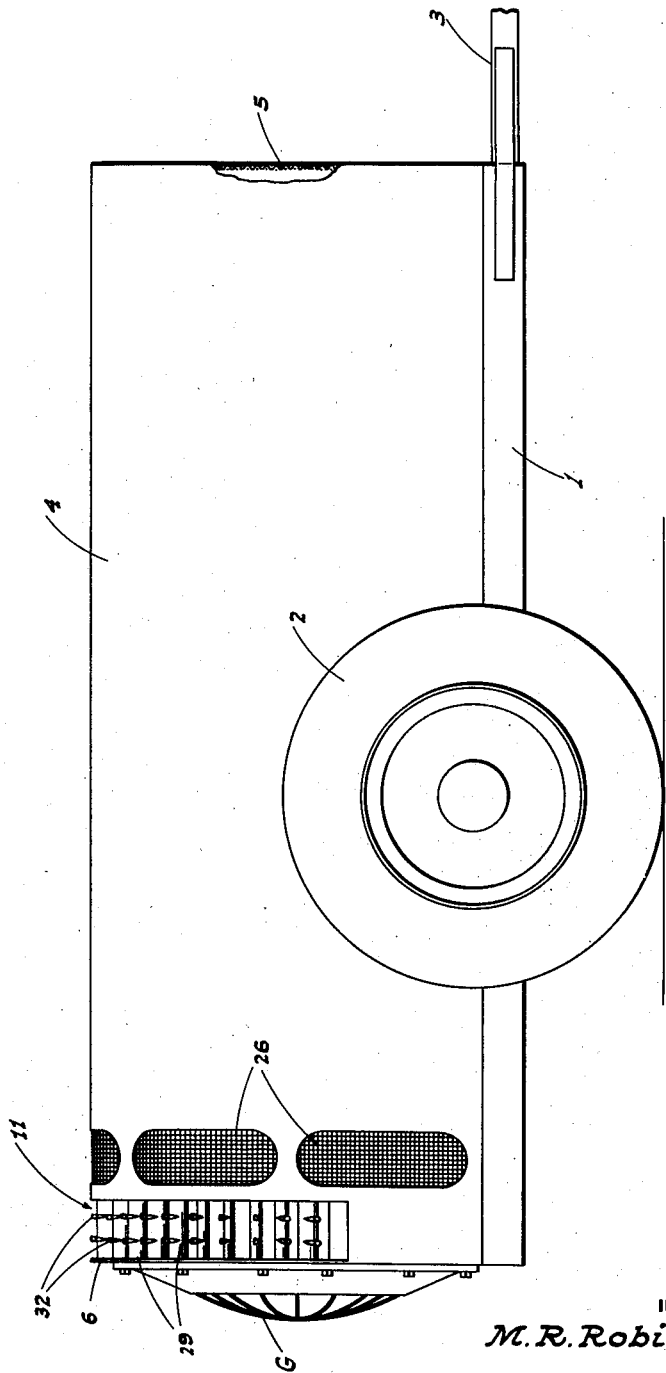
Fig. 1 is a side elevation of the agricultural spraying machine.
Figure 2:
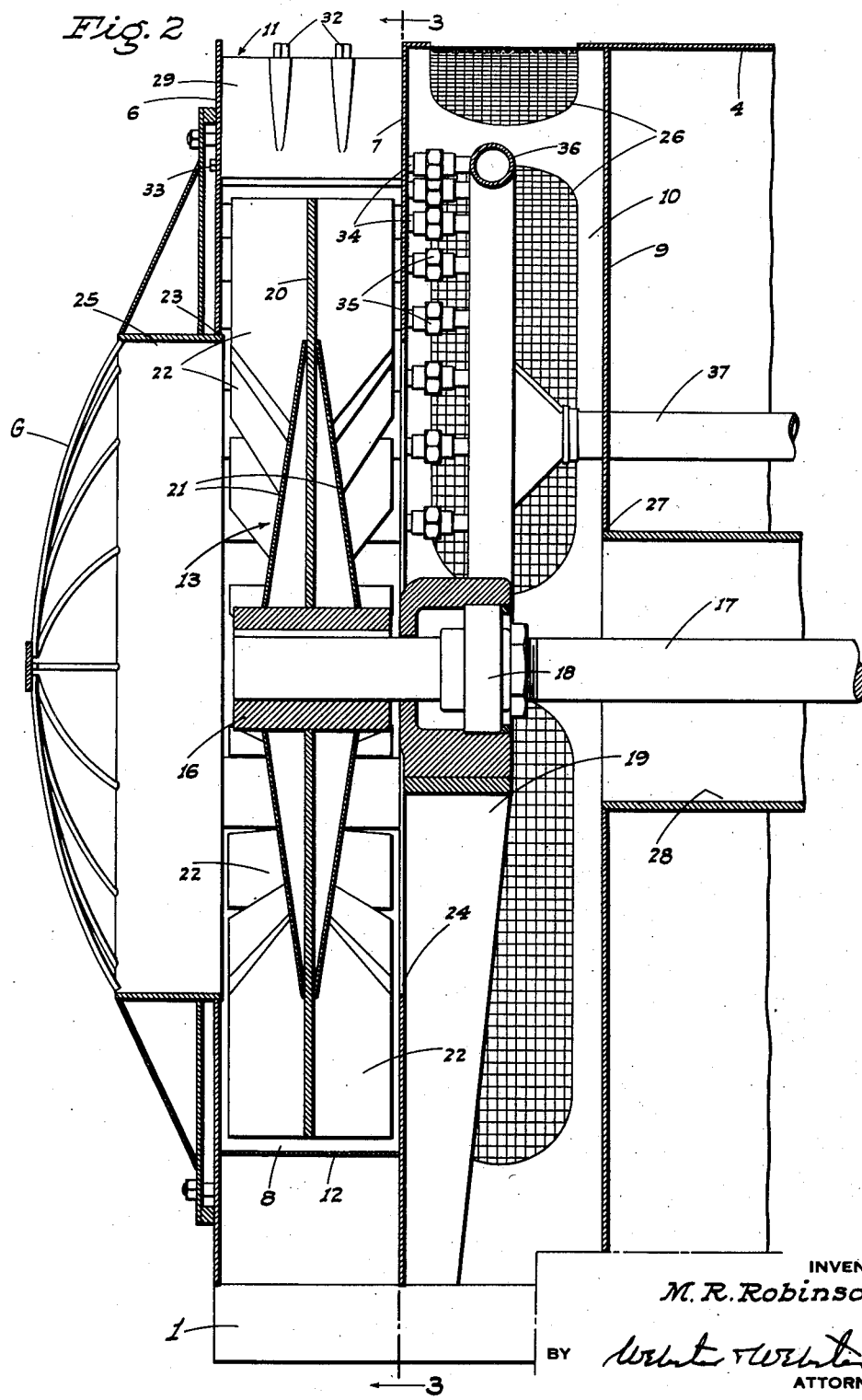
Fig. 2 is an enlarged fragmentary sectional elevation showing the fan and deflector vane assembly.
Figure 3:
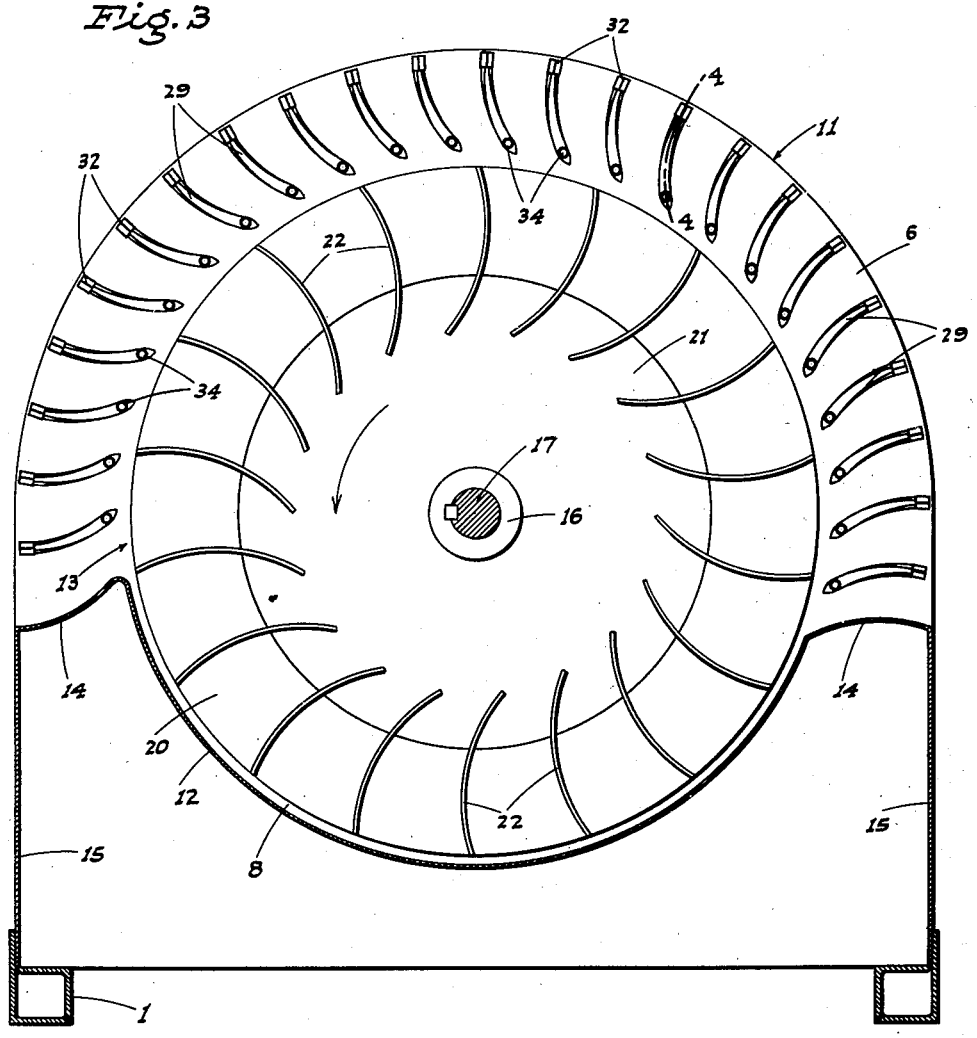
Fig. 3 is a cross section on line 3—3 of Fig. 2.
Figure 4:
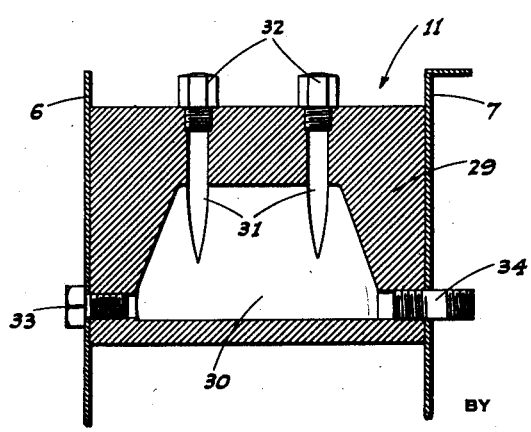
Fig. 4 is an enlarged fragmentary cross section on line 4—4 of Fig. 3 showing one of the deflector vanes and the mount therefor.

Referring now more particularly to the characters of reference on the drawings, the machine is mounted on a vehicle, of trailer type, which includes a frame 1 supported, intermediate its ends, by transversely spaced, pneumatic tire wheels 2; there being a forwardly projecting draft tongue 3 on the front end of said frame for connecting the latter in draft relation to a tractor. The trailer frame 1 is fitted, on top thereof, with a longitudinal housing 4 which is substantially semi-circular in cross section at the upper half, and straight sided therebelow, as clearly shown in Fig. 3.

The rearward portion of the housing 4 carries the novel fan and deflector vane assembly, hereinafter described in detail, whereas the housing head of said assembly includes a spray liquid supply tank and a drive engine, neither of which is shown. The forward end of the longitudinal housing 4 is formed with a screened air entry port 5 so that air may gain access into said housing for air cooling the engine.

The fan and deflector vane assembly, which includes the spray nozzle system, comprises the following arrangement:

The rear end portion of the longitudinal housing 4 is fitted, in longitudinally spaced relation, with a rearward shroud plate 6 and a forward shroud plate 7 disposed in spaced-apart relation whereby to form therebetween a fan chamber 8.

In spaced relation ahead of the forward shroud plate 7 there is a transverse partition 9 which defines an air intake chamber 10. The upper half of the plates 6, 7, and 9 are substantially semi-circular in matching relation to the configuration of the corresponding part of the longitudinal housing 4.

An arcuate slot 11 of substantially half circle extent is formed in the housing 4 circumferentially about substantially the top half of the fan chamber 8. The remaining bottom half of said fan chamber 8 is defined by an arcuate, circumferentially extending baffle plate 12 secured between the shroud plates 6 and 7.

The numeral 13 indicates, generally, a centrifugal discharge fan mounted for rotation in the fan chamber 8 and of a diameter such that its periphery is spaced some distance radially inwardly of the slot 11. The arcuate, circumferentially extending baffle plate 12 is disposed close to the periphery of the fan, and at its upper ends said baffle plate includes outward extensions 14 which extend to connection with the sides 15 of the housing 4 at opposite ends of said slot 11. With this arrangement the entire air throw or discharge of the centrifugal fan 13 must pass through the substantially semi-circular slot 11.

The fan 13 runs relatively close between the shroud plates 6 and 7, and said fan includes a hub 16 keyed to a horizontal, forwardly extending drive shaft 17 carried in a bearing 18 on the upper end of a standard 19 in the air intake chamber 10. Ahead of the chamber 10 the drive shaft passes through the transverse partition 9 and extends forwardly in the housing 4 to connection with the drive motor (not shown).

The fan 13 comprises a centrally disposed, radial parting disc 20 affixed to the hub 16 and extending outwardly to the periphery of the fan; there being relatively smaller outwardly convergent stabilizing discs 21 connected between said hub and the parting disc 20. The parting disc 20 is fixed with a circumferential row of arcuate impeller or fan blades 22 which extend from the periphery of the fan approximately half way toward the hub 16 on both sides of said parting disc 20; said fan blades 22 being evenly spaced and with the concave side facing the direction of rotation.

The air supply system for the centrifugal fan 13 comprises enlarged circular openings 23 and 24 in the shroud plates 6 and 7, respectively, concentric to the fan; the periphery of said openings being adjacent the inner end portions of the fan blades 22.

The opening 23 is fitted with a rearwardly and axially extending air passage throat 25, whose outer end is enclosed by a protector grill 26.

The opening 24 communicates with the air intake chamber 10, and the housing about said chamber is formed with a circumferential row of relatively large, screened air intake ports 26. Additionally, there is a circular opening 27 in the transverse partition 9 about the drive shaft 17, and said opening 27 is fitted with an air passage throat 28.

With the above arrangement air is sucked into the fan on corresponding sides thereof through the openings 23 and 24; the air stream from the fan delivering through the slot 11. Air entry into the intake chamber 10 is effected through the ports 26 and also through the throat 28. The air which flows through the throat 28 from within the housing 4 is that which is drawn through the screened air entry port 5 for cooling of the engine; the air after passing the engine continuing its travel through the housing 4 and throat 28 into the air intake chamber 10.

Directly inwardly of the slot 11 and between said slot and the periphery of the centrifugal fan 13, there is a circumferential row of evenly spaced deflector vanes 29; said row of vanes being of a length to extend from end to end of said slot, i. e. of substantially 180° in extent.

The deflector vanes 29 are straight sided, with said sides in matching engagement with the shroud plates 6 and 7. Lengthwise the vanes 29 are arcuate, being concave on one face and convex on the other; the concave faces being disposed so that they all face in the same direction and contra to the direction of rotation of the centrifugal fan 13. In other words, the concave faces of the deflector vanes 29 are opposed to the concavity of the arcuate fan blades 22. This is for the purpose of re-directing the flow of air as it leaves the centrifugal fan 13, and which re-direction of the air flow is necessary to the effective control of the spray pattern.

Each of the deflector vanes 29 is of hollow construction including an internal reservoir 30 and a pair of transversely spaced passages 31 which extend to the outer end of said vane. Nozzles 32 are removably threaded into the passages 31, whereby said nozzles may be removed and replaced by different sized ones thereof, dependent on the throw required, and the character of the spray liquid being used.

The adjustable mount for each vane 29 comprises the following:

Adjacent the inner end of the vane, and on opposite sides thereof, there is a cap screw 33 and a pipe nipple 34 threaded into said vane in alinement, and extending through the shroud plates 6 and 7, respectively. Thus, each alined cap screw 33, and pipe nipple 34, provides a pivotal axis about which the vane 29 is adjustable to alter the angular position of the vane with respect to the air flow from the fan 13.

The vanes 29 are normally held in fixed position when the cap screws 33 are tight.

The pipe nipples 34 communicate at their inner ends with the corresponding reservoirs 30, while at their outer ends said pipe nipples are coupled by unions 35 to a manifold 36 in the air intake chamber 10. A tank (not shown) for the spray liquid is enclosed within the housing 4, and a fluid supply pipe 37 leads rearwardly from said tank to connection with the manifold 36; there being a suitable pump and control valve assembly interposed between the supply tank and the pipe 37.

When the above described agricultural spray machine is in use, the vanes 29 are first adjusted to a selected position dependent on the character of the desired spray pattern; such spray pattern being generally fan shaped in a transverse vertical plane.

As the nozzles 31 are mounted directly on the outer ends of the deflector vanes 29, such nozzles always remain in proper discharge alinement with respect to such vanes, and this is an important feature in relation to spray pattern control.

When the deflector vanes 29 have been adjusted to desired position, the centrifugal fan 13 is driven at a speed which causes a high air volume discharge between the vanes 29 and out of the slot 11, such vanes acting to re-direct the air flow in the manner previously described.

As the air passes the vanes 29 the liquid spray is discharged into the air stream by the nozzles 31, which nozzles finely atomize the liquid, whence it is carried by said air stream in the aforesaid pattern.

The machine has relatively great spread and carry, so that there is accomplished a full and effective spraying of the trees of two adjacent rows between which the machine travels.

Additionally, the machine is operative to rapidly, yet effectively and economically, spray large acreages.

While the machine, as herein described, is adapted to spray trees on opposite sides of the path of travel, a machine, embodying the invention, yet operative to spray only to one side of said path, may be provided by limiting the length of slot 11 to approximately 90° or substantially a top quarter of the fan chamber.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the fol- lowing is claimed as new and useful, and upon which Letters Patent are desired:

1. An agricultural spraying machine including means forming a chamber having an air outlet opening therein, power driven means to cause an air stream of substantial volume to flow out of the chamber through the outlet opening, a row of spaced deflector vanes mounted in the chamber in position to deflect the air stream, flowing out of said opening, in a predetermined pattern, means to adjust said vanes to alter their outer end setting and so vary said pattern, and means to spray a liquid into the air stream after its directional or pattern control by the vanes; said last named means being nozzles on the vanes mounted to discharge from adjacent their outer ends, the vanes having reservoirs therein and the nozzles communicating with said reservoirs, and means to supply spray liquid into the reservoirs in any position of adjustment of the vanes.

2. An agricultural spraying machine, as in claim 1, in which the vanes are pivotally mounted, each such mount having a tubular member in communication with the corresponding vane reservoir, and said tubular member being included in the spray liquid supply means.

3. An agricultural spraying machine including a housing forming a fan chamber whose axis extends lengthwise of the direction of travel, a driven centrifugal fan mounted in the chamber, the housing having a part-circle, arcuate slot extending circumferentially of said fan, a circumferential row of spaced deflector vanes mounted adjacent and along the slot transversely of the latter to deflect the air stream passing therethrough from the fan, in a predetermined pattern, and means to spray a liquid into said air stream; the vanes being hollow to form reservoirs therein, and said last named means including nozzles on the outer ends of the vanes in communication with the reservoirs, spray liquid being fed into said reservoirs under pressure.

4. An agricultural spraying machine including a housing forming a fan chamber whose axis extends lengthwise of the direction of travel, a driven centrifugal fan mounted in the chamber, the housing having shroud plates on opposite sides of the fan and a part-circle, arcuate slot extending circumferentially about an upper portion of said fan, the periphery of the fan being concentric to the slot but disposed in radially inwardly spaced relation thereto, a circumferential row of spaced deflector vanes mounted transversely between the shroud plates intermediate the fan and slot, said row extending for substantially the full length of the slot, the vanes acting to deflect the air stream thrown from the fan through the slot in a predetermined pattern, nozzles mounted on the vanes in position to discharge a spray liquid into the stream adjacent the outer ends of said vanes, and means to supply spray liquid to the nozzles; the vanes having reservoirs therein to which said last named means delivers, and the nozzles being on the outer ends of the vanes in communication with the reservoirs.

5. An agricultural spraying machine, as in claim 4, in which the vanes are pivotally mounted adjacent their inner ends to the shroud plates for adjustment; each mount including a tubular pivot member communicating with the corresponding vane reservoir, and said tubular pivot being included in said last named means.

6. An agricultural spraying machine including a housing, a pair of spaced, transverse shroud plates in the housing forming a fan chamber, said shroud plates having air entry openings centrally therein, a driven, centrifugal fan in the fan chamber, the housing having an arcuate, part-circle, slot opening into the fan chamber and extending in spaced, concentric relation about an upper portion of the fan, a circumferential row of spaced deflector vanes mounted transversely between the shroud plates intermediate the fan and slot, said row extending for substantially the full length of the slot, the vanes acting to deflect the air stream from the fan through the slot in a predetermined pattern, nozzles mounted on the vanes in position to discharge a spray liquid into the stream adjacent the outer ends of said vanes, and means to supply spray liquid to the nozzles; there being an air intake chamber in the housing ahead of the fan, and said last named means including a manifold in the air intake chamber, and connections between said manifold and the nozzle on the deflector vanes.

7. An agricultural spray machine comprising a fan casing including front and rear walls one of which is provided with an opening to admit air to the casing, such casing being provided with an arcuate slot in its periphery, a centrifugal fan mounted in the casing and being concentric with the slot, the periphery of the fan terminating short of the slot, a plurality of circumferentially spaced vanes extending transversely between the front and rear walls of the casing with their top edges adjacent the slot and their bottom edges closely adjacent the periphery of the fan, discharge nozzles on the outer edge of each vane, means to conduct fluid under pressure to the nozzles; means pivoting the vanes at their lower edges to the front and rear walls of the casing whereby the vanes may be adjusted to cant at different angles relative to the periphery of the fan, and means to fix the vanes in any such adjusted position.

8. A spray machine as in claim 7 in which each vane is hollowed out to form a reservoir of substantially greater volumetric capacity than that of the nozzles, the fluid supply means including a conduit in communication with each reservoir, and means to supply fluid under pressure to the conduits.

MAYES R. ROBINSON.

References Cited in the file of this patent

UNITED STATES PATENTS

| Number | Name | Date |
|---|---|---|
| 2,099,799 | Corley | Nov. 23, 1937 |
| 2,163,474 | Sloan | June 20, 1939 |
| 2,220,082 | Daugherty | Nov. 5, 1940 |
| 2,238,120 | Launder | Apr. 15, 1941 |
| 2,267,194 | Drill | Dec. 23, 1941 |
| 2,321,792 | Bowie | June 15, 1943 |
| 2,356,950 | Root | Aug. 29, 1944 |
| 2,358,318 | Daugherty | Sept. 19, 1944 |
| 2,374,955 | Raper | May 1, 1945 |
| 2,423,008 | Daugherty | June 24, 1947 |
| 2,429,374 | Shade | Oct. 21, 1947 |
| 2,454,339 | Potts et al. | Nov. 23, 1948 |
| 2,553,199 | Loving | May 15, 1951 |

FOREIGN PATENTS

| Number | Country | Date |
|---|---|---|
| 358,244 | Germany | Sept. 7, 1922 |
| 358,457 | Great Britain | Apr. 4, 1930 |
| 588,592 | Great Britain | May 28, 1947 |
| 614,973 | France | Oct. 1, 1926 |